United States Patent [19]

Suzuki et al.

[11] 4,451,890
[45] * May 29, 1984

[54] AUTOMATIC SPEED CONTROL SYSTEM FOR AN AUTOMOTIVE VEHICLE

[75] Inventors: Kouichi Suzuki; Kazuyuki Mori, both of Yokohama, Japan

[73] Assignee: Nissan Motor Company, Limited, Kanagawa, Japan

[ * ] Notice: The portion of the term of this patent subsequent to Jul. 19, 2000 has been disclaimed.

[21] Appl. No.: 225,371

[22] Filed: Jan. 15, 1981

[30] Foreign Application Priority Data

Jan. 18, 1980 [JP] Japan .................................. 55/3657

[51] Int. Cl.³ ............................................. B60K 31/00
[52] U.S. Cl. .................................... 364/426; 364/424;
364/565; 180/176; 180/179; 123/352
[58] Field of Search ....................... 364/424, 426, 565;
340/62; 123/352; 180/170, 174, 176–179

[56] References Cited

U.S. PATENT DOCUMENTS

| | | | |
|---|---|---|---|
| 4,098,367 | 7/1978 | Fleischer | 364/424 |
| 4,117,903 | 10/1978 | Fleischer et al. | 180/179 |
| 4,120,373 | 10/1978 | Fleischer | 180/179 |
| 4,140,202 | 2/1979 | Noddings et al. | 364/426 |
| 4,254,844 | 3/1981 | Collonia | 180/179 |

*Primary Examiner*—Gary Chin
*Attorney, Agent, or Firm*—Lowe, King, Price & Becker

[57] ABSTRACT

A vehicle automatic speed control system responds to turning off of a restart switch so the system is activated in response to a control signal indicative of an error between actual vehicle speed and set speed and the restart switch being switched off. The vehicle does not unexpectedly accelerate in response to misoperation of or damage to the restart switch.

22 Claims, 3 Drawing Figures

FIG. 2

| | NORMAL OPERATION | | | | | | | | ABNORMAL CONDITION | | | | | | |
|---|---|---|---|---|---|---|---|---|---|---|---|---|---|---|---|
| | T0 | (T1) | T1 | (T2) | T2 | (T3) | T3 | (T4) | T3 | (T4) | T4 | T4 T5 | (T4 T5) | (T4 T5) | T5 |
| DIFFERENTIAL AMPLIFIER OUTPUT | H | O | H | O | H | H | H | H | H | H | H | H | O | O | O |
| RESTART SWITCH OUTPUT | L | L | L | L | H | H | L | L | H (ABNOR- MAL) | H (ABNOR- MAL) | H (ABNOR- MAL) | L (RETURN TO NORMAL) | H | H | H OR L |
| DETECTOR OUTPUT | H | O | H | O | L | L | H | H | L | L | L (SAFE) | H (DAN- GEROUS) | O (SAFE) | O (SAFE) | O (SAFE) |
| BRAKE SWITCH OUTPUT | L | H (APPLIED) | L | L | L | L | L | L | L | L | L | L | H (APPLIED) | L | L |
| ADN GATE OUTPUT | L | L | L | L | L | L | L | L | L | L | L | L | L | H | L |
| PRE-SET SPEED | VM | VM | VM | VM | VM | VM | VM | VM | VM | VM | VM | VM | VM | O | O |
| VEHICLE SPEED | SET | DECELE- RATION | DECELE- RATION | DECELE- RATION | ACCELE- RATION | ACCELE- RATION | DECELE- RATION | DECELE- RATION | DECELE- RATION | ACCELE- RATION | ACCELE- RATION | ACCELE- RATION | DECELE- RATION | DECELE- RATION | MANUALLY CONT- ROLLED |

AUTOMATIC SPEED CONTROL SYSTEM FOR AN AUTOMOTIVE VEHICLE

BACKGROUND OF THE INVENTION

The present invention relates generally to an automatic speed control system for an automotive vehicle which system controls the vehicle speed at a desired or pre-set value. More specifically, the invention relates to an automatic vehicle speed control system capable of preventing the vehicle from accelerating unexpectedly to return the vehicle speed to the set value after the control operation thereof has been interrupted and the vehicle has been decelerated by the application of the brake or the release of the clutch.

As is well known, various automatic speed control systems have been developed and proposed for mechanically, electrically or electronically controlling the vehicle speed to a desired value. To drive the vehicle at a constant speed, the desired speed is set into the vehicle speed control system to reduce the difference between the actual vehicle speed and the pre-set speed to zero. The control system is operated by the driver to set a desired vehicle speed. The set speed is stored as an analog signal to be compared with a signal indicative of the actual speed. In response to the difference berween the set speed and the actual speed, the control system automatically controls vehicle acceleration. In the automatic speed control system, a restart switch is provided which is operated when the vehicle is to be returned to a control mode after the control operation is interrupted in response to the brake being applied or the clutch being released.

When the restart switch is operated, the vehicle is immediately accelerated to return it to the set speed. In the conventional control system, in that if the restart switch is damaged and cannot be turned off, the vehicle is accelerated as soon as the brake is released or the clutch is engaged. This could be dangerous since the driver may not intend to accelerate immediately.

SUMMARY OF THE INVENTION

Therefore, it is an object of the present invention to provide an automatic speed control system for an automotive vehicle, which system is capable of inhibiting acceleration of the vehicle after the control operation is interrupted to readily and safely return the vehicle speed to the pre-set speed.

Another object of the invention is to provide an automatic speed control system with a means for preventing the control system from becoming operative while the restart switch is turned on and for resetting the pre-set value indicative of desired vehicle speed in response to turn on of the restart switch and application of the brake.

To accomplish the above-mentioned and other objects of the present invention, an automatic speed control system includes means responsive to turn off of the restart switch. This means activates the control system when a control signal is generated in response to the difference between the actual vehicle speed and the set speed, and the restart switch being switched off. The control system is further provided with another means for resetting the set speed responsive to the restart switch being on and application of the brake.

In the system according to the present invention, the vehicle is effectively prevented from unexpected acceleration caused by the misoperation of the restart switch or damage thereof. Thus, the invention ensures the safe operation of the automatic speed control system.

BRIEF DESCRIPTION OF THE DRAWINGS

The present invention will be better understood from the detailed description of the invention given hereinbelow and from the accompanying drawings of the preferred embodiment, which, however, should not be taken as limitative to the invention but as elucidation and explanation only.

In the drawings:

FIG. 2 is a table for the function of the restart switch/detector combination of the control system of FIG. 1.

DESCRIPTION OF THE PREFERRED EMBODIMENT

Figure 1:
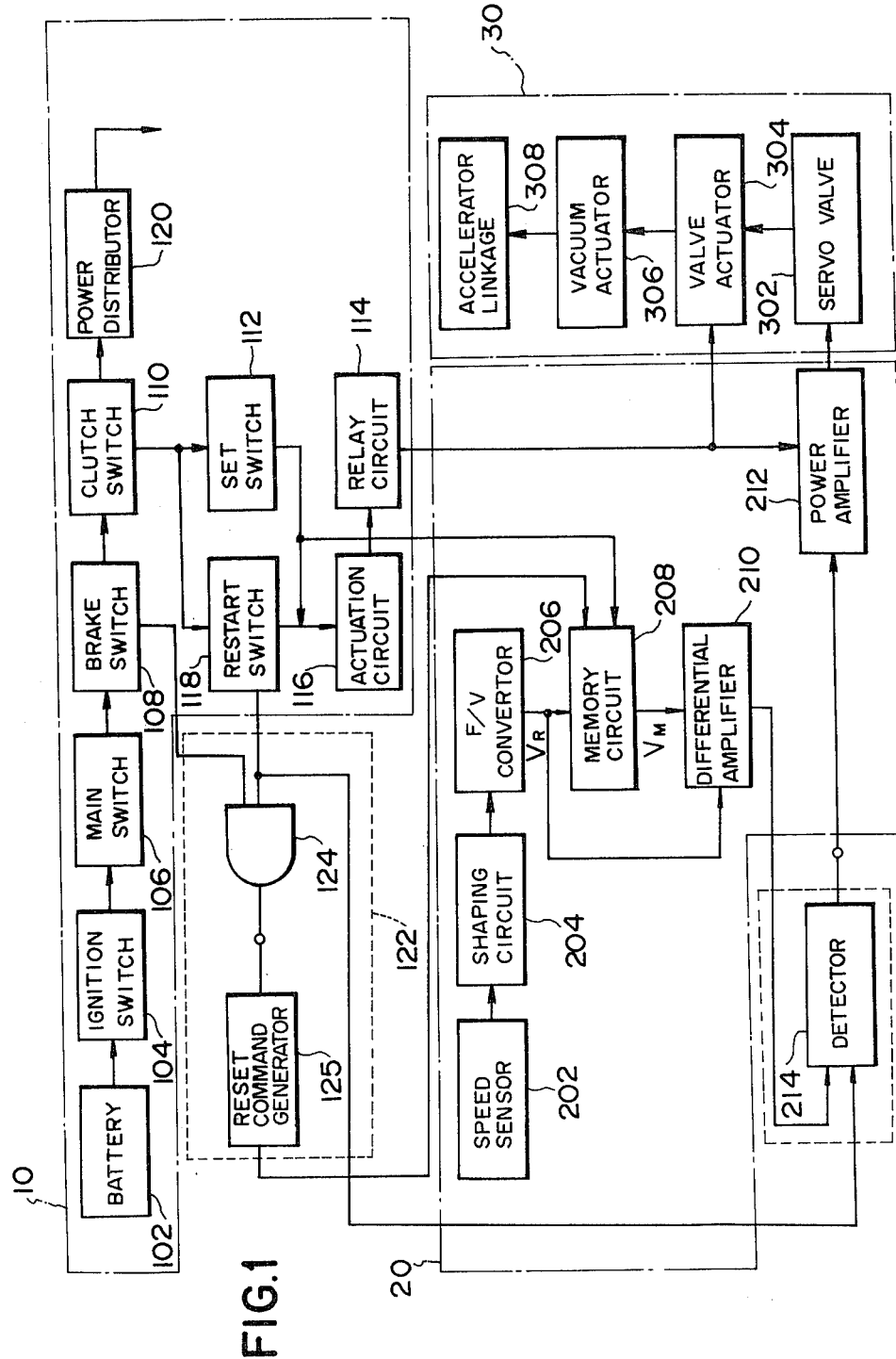
FIG. 1 is a block diagram of a preferred embodiment of an automatic speed control system according to the present invention.

Reference is now made to FIG. 1, an illustration of a preferred embodiment of an accelerator linkage 308. The servo valve 302 is responsive to an indication of vacuum pressure of the intake manifold of an internal combustion engine intake. The servo valve 302 responds to the control signal derived from the control circuit 20 to produce a control vacuum automatic speed control system for an automotive vehicle according to the present invention. The automatic speed control system generally comprises a power supply circuit 10, a control circuit 20 and an actuation means 30. The power supply circuit supplies electric power to the control circuit 20 and includes a variety of switching means. In the preferred embodiment, the electric power supply circuit 10 includes a vehicle battery 102, an ignition switch 104, a main switch 106, a brake switch 108 and a clutch switch 110. Further, the power supply circuit 10 includes a set switch 112 for pre-setting the desired vehicle speed, a relay circuit 114 to ensure that the electric power continues to be applied to the control circuit 20 even after turning off of a restart switch 118. The relay circuit 114 accompanies actuation circuit 116 which operates the relay circuit 114 when the power supply circuit 10 is turned on. The power supply circuit 10 further comprises a restart i.e., resume, switch 118.

The restart switch 118 is turned on to return the vehicle to the control mode after the control operation is interrupted. In practice, the restart switch 118 can be constructed in any suitable manner; however, in the illustrated embodiment an auto-return type push switch is preferred, which switch is normally kept in the open position. In this way, the restart switch 118 is normally in the open position and closes only when it is manually operated.

The brake switch 108 detects application of the brake pedal (not shown) to cut off the power supply circuit 10 in response. Similarily, the clutch switch 110 detects application of the clutch pedal to cut off the power supply circuit 10 in response to of the clutch being disconnected by application of the clutch pedal. The brake switch 108 and the clutch switch 110 are connected in series to the battery 102, ignition switch 104 and main switch 106. Also, the brake switch 108 and the clutch switch 110 are connected between the above-mentioned switches and an electric power distributor 120 for supplying electric power for other electrical equipment.

It will be appreciated that though the above is a specific arrangement of series switches, the construction of the power supply circuit 10 is not essential to the present invention and therefore the arrangement thereof can be modified in any suitable manner.

The control circuit 20 comprises a vehicle speed sensor 202, a shaping circuit 204, frequency-voltage converter 206, a memory circuit 208, a differential amplifier 210, and a power amplifier 212. The vehicle speed sensor 202 determines the vehicle speed in a well known manner, such as by means of an electromagnetic pick-up on the wheel shaft. The vehicle speed sensor 202 generates a pulse signal, the frequency of which corresponds to the determined vehicle speed. The pulse signal indicating the vehicle speed is supplied to the frequency-voltage converter 206 through the shaping circuit 204. The frequency-voltage converter 206 generates an analog signal $V_R$ corresponding to the frequency of the inputted pulse signal.

The set switch 112 is connected to the memory circuit 208 to operate the latter. The memory circuit 208 receives the analog signal $V_R$ from the frequency-voltage converter 206 and the command signal from the set switch 112. In response to the command signal, the memory unit 208 is set to hold the signal value of the analog signal which indicates the pre-set desired speed of the vehicle. The memory circuit 208 generates a set signal $V_M$ having a value corresponding to the set value. The analog signal fed from the frequency-voltage converter 206 is also fed to the differential amplifier 210 which compares it with the signal value of the set signal $V_{SET}$ therein. The differential amplifier 210 amplifies the difference between the signals indicating the actual vehicle speed and the set vehicle speed. The differential amplifier 210 generates a control signal for controlling the actuation means 30 to reduce the difference between the actual vehicle speed and the set speed to zero. The control signal is further amplified by the power amplifier 212 and supplied to the actuation means 30.

The actuation means 30 comprises a servo valve 302, a valve actuator 304, a vacuum actuator 306 and an which has a pressure indicative of and proportional to the value of the control signal. The valve actuator 304 is operated by the control vacuum derived from the servo valve 302 to actuate the vacuum actuator 306. In response to the operation of the vacuum actuator 306, the accelerator linkage 308 operates to reduce the difference between the actual vehicle speed and the set speed to zero. In practice, the accelerator linkage 308 is mechanically connected to a control unit of the carburetor (not shown) to control the carburetor air flow rate.

In the illustrated embodiment, the restart switch 118 is connected to the memory unit 208 through a resetting means 122. The resetting means 122 comprises an AND gate 124 and a reset command generator 125. AND gate 124 is also responsive to the brake switch 108. The AND gate 124 is enabled to generate an output in response to high level outputs from the restart switch 118 and the brake switch 108. Further, a detector 214 is connected between the output of differential amplifier 210 and the input of power amplifier 212. The construction and the function of the detector 214 are such that the output terminals of the detector 214 has a high level only when the output of the differential amplifier 210 has a high level and the output of the restart switch 118 has a low level.

The operation of the automatic control system of FIG. 1 is now described.

Upon setting the desired vehicle speed, the set switch 112 is turned on. The memory circuit 208 then responds to set switch 112 being activated by storing the analog signal voltage $V_R$ indicating the vehicle speed determined by the vehicle speed sensor 202. Thereafter, the memory circuit 208 derives a constant voltage indicative of the value of set signal $V_M$. The set signal $V_M$ is fed to the differential amplifier 210. The differential amplifier 210 compares the voltage indicative of the value of the set signal $V_M$ with the signal voltage $V_R$ indicating the actual vehicle speed. In response to this voltage difference, the differential amplifier 210 generates a control signal for the actual vehicle speed to reduce the difference between the set speed and the actual vehicle speed to zero. The control signal is fed to the servo valve 302 of the actuation means to produce therein a control vacuum having a pressure proportional to the control signal value. In response to the control vacuum, vacuum actuator 306 operates the accelerator linkage 308 in order to adjust the opening ratio of the carburetor, for example, to control engine speed. Thereby, the vehicle speed is automatically adjusted to the set vehicle speed.

The control system stays in operation until either the brake is applied, causing the brake switch 108 to turn off, or the clutch is released, causing turn off of clutch switch 110.

When the brake is applied or the clutch released, the power supply circuit 10 is cut off to stop the supply of electric power to the control circuit 20, thereby interrupting the operation provided by the control system.

To return to the control mode, the restart, i.e., resume, switch 118 is turned on, causing the actuation circuit 116 to become operative. Therefore, if the restart switch 118 returns to the off-position, as it does in normal operation, power can be supplied to the control circuit 20 through the relay circuit 114. At this time, turn on of restart switch 118 results in a high level output from the restart switch 118 being supplied to the detector 214. When restart switch 118 returns to the normal off-position, it supplies a low level signal to the detector 214. As stated above, the detector 214 also responds to the output of the differential amplifier 210. The detector 214 functions as illustrated in FIG. 2 so the output thereof has a high level only when the output of the differential amplifier has a high level and the output of the restart switch has a low level.

Figure 3:
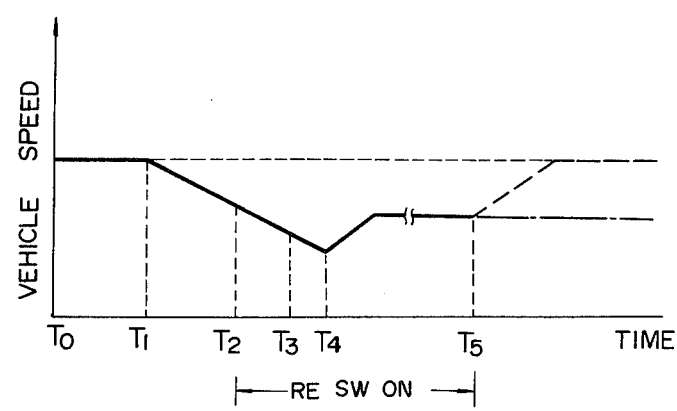
FIG. 3 is a waveform of the restart switch and the detector operation as a function of time.

The operation of the restart switch 118 with that of the detector 214 is now described in more detail with reference to FIG. 3. In FIG. 3, assume that the brake is applied or the clutch is released at time $T_1$ with the system in an automatic speed control driving condition and the power supply circuit 10 being open to stop the supply of electric power to the control circuit 20. Thus, the vehicle is decelerated by engine braking, for example. Next assume that the driver, acting in a typical manner, releases the brake and turns on the restart switch 118 at time $T_2$ (as seen from FIG. 2) and the restart switch is kept at that position until time $T_3$. Thereby, detector 214 derives a low level signal between times $T_2$ and $T_3$ to de-activate the control circuit 20. On returning the restart switch 118 to the normal position at time $T_3$ and thereby returning the output thereof to low level, the detector 214 supplies a high level signal to the power amplifier 212 which supplies an output control signal to the actuation means 30.

Now assume that restart switch 118 is defective and, for this or other reasons, is maintained on beyond time $T_3$, causing the output of detector 214 to be kept at a low level to maintain the control system inoperative. Next, assume that the driver detects that the vehicle is still decelerating and manually operates the vehicle and that, for some reason such as vehicle vibration, the restart switch is turned off at a time $T_5$. As a result, detector 214 is caused to derive a high level output. As previously described, such an output tends to make the control system rapidly increase the vehicle speed to the set speed. If this were to happen under the assumed circumstances the vehicle speed is suddenly increased and is no longer controlled by the driver. Next assume that at some time $T_s$ in the internal $T_2$- the brake pedal is applied while the restart switch 118 is in an on position. This causes the inputs of the AND gate 124 of the resetting means 122 from both the restart switch 118 and the brake switch 108 to have a high level to activate the AND gate 124. In this situation, the reset command generator 125 generates a reset command to clear the pre-set value in the memory unit 208. Thus, the control system can not work after cancelling the pre-set value. This permits the driver to drive the vehicle manually without unexpectedly returning the vehicle speed to the set value, if the resume switch is turned off at time $T_5$.

The actuation means 30 is activated by the control signal fed from the control circuit 20. Namely, when the restart switch 118 is returned to the normal position, the servo valve 302 operates to produce a control vacuum commensurate with the value of the control signal from amplifier 210. The valve actuator 304 therefore becomes operative to actuate the vacuum actuator 306 to control the accelerator linkage 308. Thus, the vehicle accelerates until the pre-set speed is reached.

What is claimed is:

1. An automatic speed control system for an automotive vehicle, which system controls the vehicle speed to a preset constant speed, comprising:
   first means for setting a desired constant vehicle speed and for comparing said set vehicle speed with the actual vehicle speed to obtain an indication of the difference therebetween, said first means generating a control signal having a value representative of the difference, the control signal having a high level when commanding activation of the automatic speed control system;
   second means for controlling accelerator means of the vehicle in response to said control signal to control the actual vehicle speed to reduce the difference between the set speed and the actual speed to zero;
   third means for detecting a vehicle driving condition causing interruption of the speed control operation and for deriving an interruption signal as said vehicle driving condition is detected, said third means feeding said interruption signal to said first means for interrupting the operation of said first means;
   fourth means for deriving a resume signal for resuming the operation of said first means at the same condition it had when it was interrupted by said interruption signal to thereby return the vehicle speed to said set speed, the resume signal having a high level when commanding resumption of operation of the first means and a low level when in a normal state when resumption is not commanded;
   fifth means responsive to said resume signal for holding said first means at said interrupted condition thereby to delay the response of said second means to the resume signal to return the vehicle speed to said set speed, said fifth means including a detector responsive to said control signal and said resume signal for enabling said first means in response to the control signal having the high level and the resume signal having the low level; and
   sixth means for resetting said set speed in response to simultaneous occurrence of said interruption signal and said resume signal.

2. An automatic speed control system as set forth in claim 1, wherein said third means is a brake switch responsive to the application of a brake of the vehicle, whereby a signal is generated to interrupt the operation of said control system as the brake is applied.

3. An automatic control system as set forth in claim 1, wherein said third means is a clutch position switch responsive to the release of a clutch of the vehicle, whereby a signal is generated to interrupt the operation of said control system as the clutch is released.

4. An automatic speed control system as set forth in claim 2, wherein said sixth means is associated with said fifth means and said brake switch, said sixth means being operative in response to turning off of said brake switch under control of said fifth means.

5. An automatic speed control system for an automotive vehicle which controls the vehicle speed to a preset constant speed, comprising:
   a speed sensor for detecting the vehicle speed and deriving a sensor signal indicative of the vehicle speed;
   setting means for setting a desired constant speed, said setting means being operative at said desired constant speed and deriving a reference signal indicative of set speed;
   a control signal generator for comparing said sensor signal and said reference signal to derive an indication of the difference therebetween and for generating a control signal having a value determined by the determined difference;
   first means for controlling an accelerator means of the vehicle, said first means being responsive to said control signal to reduce the difference between the set speed and the actual vehicle speed to zero;
   second means for detecting deceleration of the vehicle to derive a disabling signal for disabling said control signal generator;
   third means for deriving a resume signal for resuming operation of said control signal generator as disabled in response to said disabling signal and thereby returning the vehicle speed to said set speed;
   fourth means, associated with said third means, for interrupting said resume signal and for thereby delaying resumption of operation of said control signal generator, said fourth means being responsive to termination of said resume signal to allow said first means to become operative; and
   fifth means responsive to said disabling signal and said resume signal for resetting said set sped derived by said setting means, said fifth means being operative when both of said disabling signal and said resume signal are simultaneously supplied thereto.

6. An automatic speed control system as set forth in claim 5 wherein said second means is a brake switch responsive to application of a brake, whereby said disabling signal is produced as the brake is applied.

7. An automatic speed control system for an automotive vehicle for controlling the vehicle to a preset constant speed, comprising:
a speed sensor for deriving a sensor signal having a value representative of the vehicle speed;
setting means for setting a desired constant speed and deriving a reference signal having a value representative of said desired constant speed as a set speed;
a control signal generator for deriving an indication determined by the difference between said sensor signal value and said reference signal value and deriving a control signal having a value based on the determined difference, the control signal having a high level when commanding activation of the automatic speed control system;
first means for controlling an accelerator means of the vehicle, said first means being responsive to said control signal to reduce the difference between the vehicle speed and the set speed to zero and thereby to maintain the vehicle speed at said set speed;
second means for detecting deceleration of the vehicle to derive a disabling signal for disabling said control signal generator;
third means for deriving a resume signal, the third means when operated causing the resume signal to have a high level and enabling said control signal generator, the third means being disabled in response to said disabling signal and when disabled causing the resume signal to have a low level; and
fourth means for delaying transmission of said resume signal, said fourth means being responsive to termination of said resume signal to transmit an enabling signal to said control signal generator to enable the latter when said resume signal terminates, said fourth means being responsive to said control signal and said resume signal and functioning as a gate to feed said enabling signal to said control signal generator when said control signal has a high level and said resume signal has a low level.

8. An automatic speed control system as set forth in claim 7, wherein said second means is a brake switch responsive to application of a brake of the vehicle, whereby the disabling signal is generated as the brake is applied.

9. An automatic speed control system as set forth in claim 5 or 7, wherein said second means is a clutch switch responsive to disconnection of a clutch of the vehicle whereby the disabling signal is generated as the clutch is disconnected.

10. An automatic speed control system as set forth in claim 7, wherein said first means includes a memory means responsive to a set switch to store the sensor signal value indicating the desired vehicle speed and which derives said reference signal as a constant value corresponding to a set value of the sensor signal.

11. An automotive control system as set forth in claim 7 or 10, further including fifth means associated with a brake switch for generating a reset command when said brake switch turns off in response to a brake of the vehicle being applied while said forth means is in an operative position, said reset signal being fed to said setting means including a memory circuit for resetting the pre-set value therein.

12. The automatic speed control system of claim 7 further including fifth means responsive to said disabling signal and said resume signal for resetting said set speed in said setting means in response to said disabling and resume signals being simultaneously derived.

13. An automatic speed control system as set forth in claim 12 wherein said second means is a brake switch responsive to application of a brake, whereby said disabling signal is produced as the brake is applied.

14. An automotive cruise control system comprising:
a cruise control circuit for detecting a difference between a vehicle speed and a preset cruise speed and for controlling a vehicle speed at said preset cruise speed;
a disabling circuit responsive to a predetermined vehicle operation parameter for deriving a disabling signal to disable said cruise control circuit;
a resume circuit for deriving a resume signal to resume operation of said cruise control circuit; and
delay means connected between said cruise control circuit and said, resume circuit for deriving an enabling signal in response to termination of to said resume signal and for holding said cruise control circuit at a disabled condition as long as said resume signal is present.

15. The system as set forth in claim 14 further comprising a resetting circuit for resetting said preset cruise speed, said resetting circuit being responsive to said disabling signal and said resume signal for deriving a reset command for resetting said cruise speed when the disabling and resume signal are simultaneously derived.

16. The system of claim 14 wherein said disabling circuit includes means for detecting a decelerating condition of the vehicle to derive said disabling signal.

17. The system of claim 16 wherein said disabling circuit is associated with a brake switch for deriving said disabling signal in response to a brake of the vehicle being applied.

18. The system as set forth in claim 16, wherein said disabling circuit is associated with a clutch switch for deriving said disabling signal in response to a clutch of the vehicle being disconnected.

19. The system as set forth in claim 14 wherein said cruise control circuit includes a control signal generator for deriving a high level control signal for varying a vehicle speed at a given rate as long as the vehicle speed is different from said preset cruise speed, and said delay circuit derives said enabling signal in response to termination of said resume signal while the control signal has the high level.

20. A system for automatically controlling the speed of a vehicle including acceleration means, deceleration means, such as a brake or clutch, and speed sensing means comprising memory means; set switch means coupled to the deceleration means; said set switch means, when activated, being responsive to the deceleration means for setting a desired speed for the vehicle into the memory means; means connected to be responsive to the memory means and the speed sensing means for deriving an error signal indicative of the deviation between the desired set speed and the sensed speed; a power amplifier connected to provide a signal to said acceleration means and having a power supply terminal associated therewith; a logic circuit responsive to the error signal and a logic signal, the logic circuit coupling the error signal to and decoupling the error signal from an input of the power amplifier in response to the logic signal respectively having first and second values; a power supplying circuit for selectively supplying power to and removing power from the power supply terminal; a resume switch means having a normal off state and an operator activated on state, said resume switch means normally being in said operator activated on state only for the duration of operator activation; the power supplying circuit being connected to be responsive to the set switch means, the resume switch means and the deceleration means so that the power is continuously supplied to the power supply terminal in response to activation of the set switch means and in response to changing of the resume switch means state from the on state to the normal off state and so that power is removed from the power supply terminal in response to activation of the deceleration means; and means responsive to the resume switch means being respectively in the off and on states for deriving the first and second logic values, whereby in response to the resume switch means being defective so that it remains in the on state after termination of operator activation and after deactivation of the decelerator means, no error signal is supplied by the amplifier to the accelerator means.

21. A system for automatically controlling the speed of a vehicle including acceleration means, deceleration means, such as a brake or clutch, and speed sensing means comprising memory means, set switch means coupled to the speed sensing means, said set switch means, when activated, setting a desired speed for the vehicle into the memory means; means connected to be responsive to the memory means and the speed sensing means for deriving an error signal indicative of the deviation between the desired set speed and the sensed speed; a selective coupling network means having signal input and output terminals as well as first and second control input terminals, the error signal being provided to the signal input terminal, said selective coupling network means operative for selectively coupling said error signal to said acceleration means and operating such that: in response to first and second levels of a first control signal being applied to the first control input terminal while the second control input terminal is receiving a first binary value of a second control signal, the signal at the signal input terminal is respectively coupled to and decoupled from the signal output terminal, and such that in response to a second binary value of said second control signal being applied to the second control input terminal the signal at the signal input terminal is decoupled from the signal output terminal regardless of the level of said first control signal applied to the first control input terminal; the system further comprising a resume switch means having a normal off state and an operator activated on state; the first control input terminal being connected to be responsive to the set switch means, the resume switch means and the deceleration means so that the first level of said first control signal is continuously supplied to the first control input terminal in response to activation of the set switch means and to activation of the resume switch means to the normal off state and the second level of said first control signal is continuously supplied to the first control input terminal in response to activation of the deceleration means; and means responsive to the resume switch means being respectively in the off and on states for deriving the first and second binary values of said second control signal for provision to said second control input terminal; whereby in response to the resume switch means being defective and remaining in the on state after termination of operator activation when said second level of said first control signal is supplied to said first control input terminal and after deactivation of the deceleration means no error signal is supplied by the selective coupling network to the acceleration means.

22. The system of claim 20 or 21 further including means connected to be responsive to the deceleration means and the resume switch means for erasing from the memory means the desired speed set into the memory means in response to the resume switch means being on simultaneously with activation of the deceleration means.

* * * * *